United States Patent [19]
Cook

[11] 4,223,702
[45] Sep. 23, 1980

[54] DRAIN LINE FOR RECREATIONAL VEHICLES

[76] Inventor: James Cook, P.O. Box 101, Sugarland, Tex. 77478

[21] Appl. No.: 973,002

[22] Filed: Dec. 26, 1978

[51] Int. Cl.³ .................... F16K 27/12; F16L 3/00
[52] U.S. Cl. .................... 138/106; 138/155; 138/178; 4/323; 137/355.12; 137/355.16; 137/355.2; 285/239; 285/302
[58] Field of Search ............ 138/103, 106, 107, 120, 138/121, 155, 178; 285/62, 302, 239, 252, 31; 137/355.12, 355.16, 355.2; 239/195; 4/1, 114

[56] References Cited

U.S. PATENT DOCUMENTS

| | | | |
|---|---|---|---|
| 778,936 | 1/1905 | Witmond | 285/239 X |
| 1,299,441 | 4/1919 | Ennis | 285/302 X |
| 2,095,702 | 10/1937 | Johnson | 285/302 X |
| 2,848,265 | 8/1958 | France | 285/302 X |
| 2,902,298 | 9/1959 | Kolthoff | 285/239 |
| 3,520,725 | 7/1970 | Hamrick | 137/355.16 X |
| 3,730,228 | 5/1973 | Gibbs | 138/106 |
| 3,760,430 | 9/1973 | Brenden | 285/252 |
| 3,809,348 | 5/1974 | DiLaura | 138/106 X |
| 4,133,347 | 1/1979 | Mercer | 137/355.16 |

FOREIGN PATENT DOCUMENTS

817543  8/1951  Fed. Rep. of Germany .......... 138/121
723766  4/1932  France .................................. 285/302

*Primary Examiner*—James E. Bryant, III
*Attorney, Agent, or Firm*—Duckworth, Hobby, Allen & Pettis

[57] ABSTRACT

A telescoping drain line for connecting recreational vehicles to a sewage system has telescoping rigid wall drain pipes having a plurality of pipe sections telescoping one within the other. A flexible hose extends through the telescoping pipes and out each end thereof and has means for attaching to a recreational vehicle drain at one end and into a sewage line opening at the opposite end thereof. The flexible hose is attached at each end of the telescoping rigid wall drain pipe to prevent the flexible pipe from collapsing or coming out of the rigid pipes. The flexible pipe will fold within the telescoping pipe for storage of the drain line.

9 Claims, 6 Drawing Figures

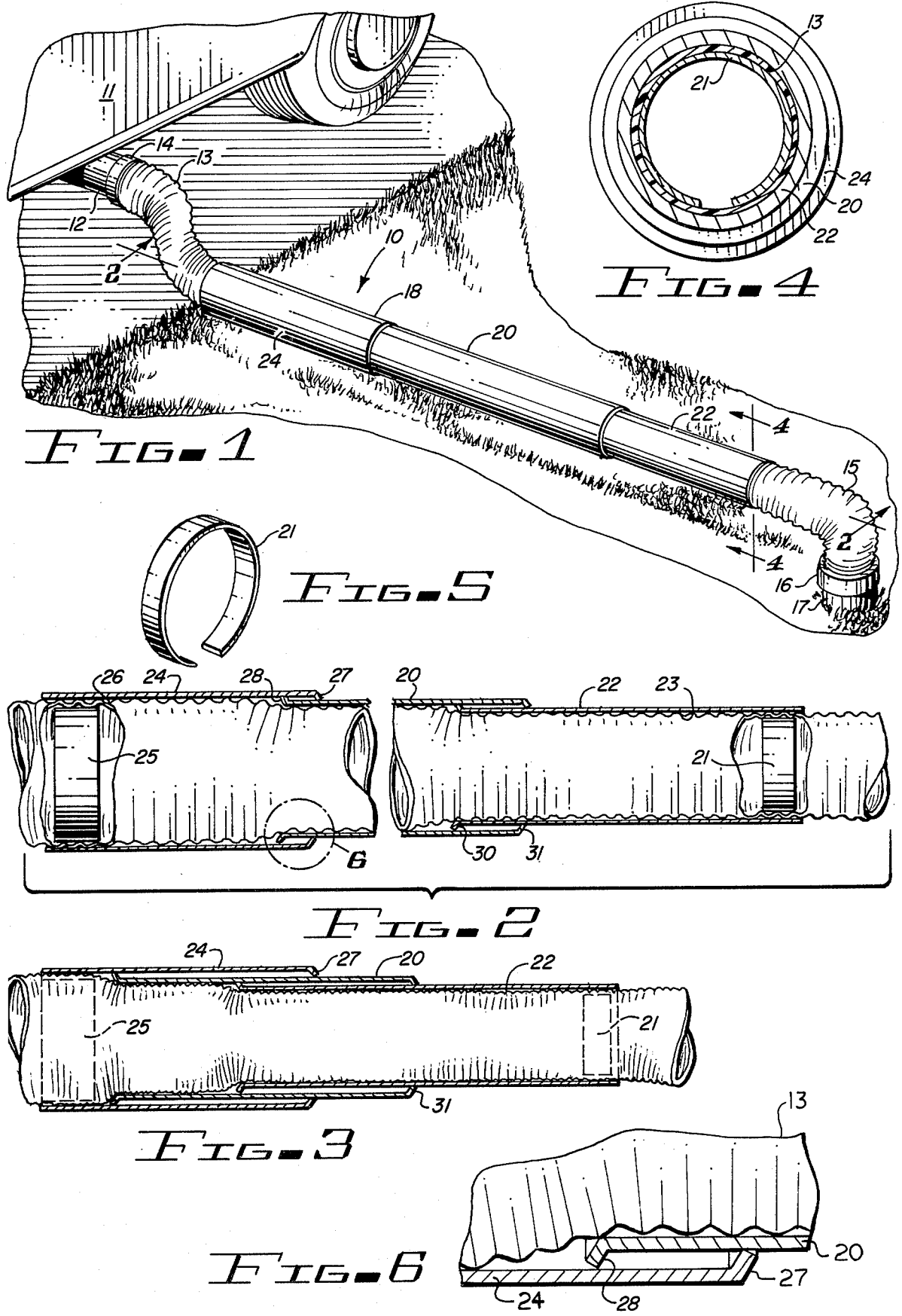

DRAIN LINE FOR RECREATIONAL VEHICLES

BACKGROUND OF THE INVENTION

The present invention relates to a drain line for draining waste from recreational vehicles and especially to a telescoping drain line having a continuous flexible pipe passing therethrough.

DESCRIPTION OF THE PRIOR ART

Recreational vehicles that pull into campgrounds are required to connect their drain lines from their plumbing facilities in the recreational vehicle to a sewer hook-up provided by the campground. This generally requires a pipe that will extend varying distances for the hook-up. Presently a flexible hose is generally used which is stored in a compartment on the vehicle and is removed when the recreational vehicle is in service. The flexible hose is connected from the recreational vehicle or camper drain to the sewer facility provided. However, this requires special storage facility and when waste and waste water are discharged through the flexible line, the suction created on the flexible hose has a tendency to collapse the hose, thereby requiring additional support. To correct this problem, rigid wall telescoping sewer drains have been offered which have sliding members which extend the necessary length for hook-up and then retract for storage. This type of system can be seen in U.S. Pat. No. 3,730,228 for a Hose Case Assembly. This system works satisfactorily, but has several disadvantages, one of which is that soil tends to accumulate on the exterior wall when the rigid pipes are laid on the earth, and the soil in the smaller telescoping members gets on the larger members interior walls, damaging the seals between the telescoping members and resulting in leakage. In addition, the telescoping members require close fits and seals that will prevent leakage at any point of telescoping since the unit must be adjusted for a variety of different positions between the recreational vehicle and the sewer line. In another U.S. Pat. No. 3,819,137, a trestle for a flexible hose is provided in which a collapsing trestle supports the conventional flexible hose to provide a more direct gravity flow of the sewage to prevent accumulation in lower spots of the terrain. Other patents that might be of interest can be seen in U.S. Pat. No. 2,852,216 for a refueling conduit; U.S. Pat. No. 3,860,978 for a drain assembly for sinks and bathtubs utilizing a flexible hose; and U.S. Pat. No. 3,838,713 for a trailer and tube connection incorporating a flexible hose. In U.S. Pat. No. 3,760,430 an adapter apparatus for a portable sewage disposal system is provided for a flexible hose drain line connection.

The present invention is directed towards solving both the problem of collapsing rigid drain hose and preventing the accumulation of sewage from the uneven earth, and at the same time, avoiding the problems inherent in telescoping drain lines by having a flexible drain hose extending through a rigid telescoping pipe and fastened at each end so that the flexible hose can extend and contract with the telescoping pipe, but preventing any leakage or the use of special seals in the telescoping sections.

SUMMARY OF THE INVENTION

The present invention relates to a telescoping sewer drain hose for recreational type vehicles and has a telescoping rigid tubular wall drain pipe having a plurality of tubular sections telescoping one within the other. A flexible hose extends through the telescoping drain pipe and is attached at each end of the telescoping drain pipe to each of the end tubular telescoping sections so that the flexible pipe can contract and expand with the telescoping of the rigid pipes. Each end of the flexible pipe may have fitting clamps or assemblies for attaching to the drain line of the recreational vehicle and to the sewer inlet. The telescoping pipes can be held together by intersecting but oppositely directed flanges on the end of each telescoping section, while the connection of the flexible pipe to the rigid telescoping pipe can be with a spring loaded band located inside the flexible pipe and expanding against the interior wall of the rigid tubular section.

BRIEF DESCRIPTION OF THE DRAWINGS

Other objects, features and advantages of the present invention will be apparent from the written description and the drawings, in which:

FIG. 1 is a perspective view of a recreational vehicle drain line connected between a recreational vehicle and a sewer inlet;

FIG. 2 is a sectional view taken on the line 2—2 of FIG. 1;

FIG. 3 is a sectional view of a partially collapsed drain line of FIGS. 1 and 2;

FIG. 4 is a sectional view taken on the line 4—4 of FIG. 1;

FIG. 5 is a perspective view of a spring loaded band for connecting the flexible hose to the rigid tubular sections;

FIG. 6 is an enlarged section taken on the circle 6 of FIG. 2;

DESCRIPTION OF THE PREFERRED EMBODIMENT

Referring to the drawings, a telescoping drain line connection 10 is connected to a recreational vehicle 11 at the drain pipe 12 in FIG. 1. Drain line 10 has a flexible sewage hose 13 which is connected by a clamp or other fitting 14 to the recreational vehicle drain line 12. At the opposite end 15 of the hose 13, a second fitting assembly 16 can connect to a sewer inlet 17. The telescoping rigid polymer pipe 18 is a plurality of telescoping tubular sections 20, 22 or 24, each of which may be a polymer or plastic material, each section being slightly smaller in size than the next section, so that one can telescope within the other. The flexible line 13 passes entirely through the rigid telescoping pipe 18 so that it forms one continuous line from the connection 14 on the recreational vehicle 11 drain line 12 to the sewer inlet 17 thereby preventing leakage in the drain line. The telescoping pipe 18 prevents the flexible line 13 from following contours in the earth and thereby accumulating waste and also preventing the collapse of the line. The line 13 is connected as shown in FIG. 2 by a spring loaded band 21 located inside the flexible hose 13 adjacent the end of one tubular section 22, so that the band expands the hose 13 against the internal wall 23 of the tubular section 22, thereby holding the flexible line 13 in position at that point, and simultaneously expanding it intermittent its ends and preventing the collapse of the line. At the opposite end of the tubular pipe 18, the larger tubular section 24 has a second and larger spring loaded band 25 expanding against the inside of the hose 13 and against the internal wall 26 of the tubular section 24. This also prevents the hose 13 from sliding out one end or the other of the pipe 18. The drain pipe 18 tubular section 24 may have an inwardly turned flange 27 while the next adjacent tubular pipe 20 may slide internally of the pipe 24 and may include an alternately turned flange 28, so that the flanges 27 and 28 will intersect when the pipes are extended their full length, preventing pipe 20 from sliding out of pipe 24. The flanges also have the benefit, as shown in FIG. 6, of preventing damage to the hose 13 by the curved flange 28 sliding against the hose 13 to fold it, but to allow it to slide between pipes during the telescoping of the pipe 18 for storage on the recreational vehicle when not in use. Similarly, pipe 22 has external flange 30 at one end protruding into the pipe 20, which has an internally extending flange 31 for engaging the flange 30. The flexible drain 13 requires no seals between the telescoping tubular sections 20, 22 and 24, to prevent leakage from between the telescoping tubular sections.

In operation, the pipe 18 is telescoped closed, as partially illustrated in FIG. 3, and packed on the recreational vehicle. Upon arriving at a campsite, the drain line 10 is removed, the telescoping pipe portion is telescoped to the desired length, which simultaneously expands the flexible hose 13 located inside the telescoping pipe 18 between the steel bands 21 and 25. The flexible hose 13 extending out either end of the pipe 18 can then be used to connect to the drain line 12 of the recreational vehicle 11 at one end and to the sewer 17 on the opposite end. In the sectional view of FIG. 4, the tubular pipe can be seen having the largest telescoping tubular section 24 adjacent the telescoping tubular section 20, which is adjacent the telescoping tubular section 22, which has the flexible sewage hose 13 mounted thereinside by the spring loaded band 21. It should be clear at this point that an improved drain line has been provided for recreational vehicles, campers, or the like, which can be manufactured for the most part from commercially available materials. The telescoping tubular sections 20, 22 and 24 can be made of conventional polymer pipe, such as PVC, cut to size and having the ends flanged, while the flexible sewage hose 13 is commercially available, as are clamps and fitting assemblies for connecting to hose to the drain line and to the sewer inlet. The spring loaded expansion bands for compressing the flexible hose 13 to the tubular sections can be made from stainless steel or any other low corrosive resilient material desired.

The present invention is, accordingly, not to be construed as limited to the particular forms disclosed herein, which are to be regarded as illustrative rather than restrictive.

I claim:

1. A telescoping drain line for recreational vehicles, or the like, comprising in combination:
   a telescoping rigid wall drain pipe having a plurality of sections telescoping one within the other;
   a flexible hose extending through said telescoping rigid wall drain pipe for contracting and expanding with the telescoping of said telescoping rigid drain pipe; and
   means for attaching said flexible hose to at least two telescoping rigid wall pipe sections between the ends of said flexible hose, whereby said flexible hose will expand or contract inside said telescoping rigid wall drain pipe responsive to the telescoping of said pipe.

2. The apparatus in accordance with claim 1, in which the means for attaching said flexible hose to said telescoping rigid wall pipe sections includes a spring loaded arcuate band positioned inside said flexible hose for expanding said flexible hose against the interior wall of one section of said telescoping rigid wall drain pipe.

3. The apparatus in accordance with claim 2, in which said flexible hose has a drain line fitting on one end thereof.

4. The apparatus in accordance with claim 3, in which said flexible hose has a sewer inlet fitting on the other end thereof.

5. The apparatus in accordance with claim 4, in which said telescoping rigid wall drain pipe has a plurality of tubular sections.

6. The apparatus in accordance with claim 5, in which the largest tubular section of said telescoping rigid wall drain pipe has an annular flange on one end thereof directed towards the elongated axis of said tubular section.

7. The apparatus in accordance with claim 6, in which the plurality of tubular sections of said telescoping rigid wall drain pipe includes a second tubular section telescopically mounted in the said largest tubular section and said second tubular section has an annular flange flanged away from the elongated axis thereof, whereby said annular flanges on said largest tubular member and said second tubular section will intersect to prevent the separation of said tubular sections.

8. The apparatus in accordance with claim 7, in which each intersecting tubular section has intersecting annular flanges.

9. The apparatus in accordance with claim 8, in which said telescoping rigid wall drain pipe is made of a polymer material, and said flexible hose is made of a second polymer material.

* * * * *